(12) United States Patent
Wilfong

(10) Patent No.: US 7,927,488 B1
(45) Date of Patent: Apr. 19, 2011

(54) WATER PURIFICATION SYSTEMS

(76) Inventor: Rudy B. Wilfong, Fort Wayne, IN (US)

( * ) Notice: Subject to any disclaimer, the term of this patent is extended or adjusted under 35 U.S.C. 154(b) by 274 days.

(21) Appl. No.: 12/262,313

(22) Filed: Oct. 31, 2008

Related U.S. Application Data

(60) Provisional application No. 61/032,628, filed on Feb. 29, 2008.

(51) Int. Cl.
*C02F 1/42* (2006.01)
(52) U.S. Cl. .......... 210/220; 210/259; 210/263
(58) Field of Classification Search ........... 210/220, 210/259, 263
See application file for complete search history.

(56) References Cited

U.S. PATENT DOCUMENTS

| | | | |
|---|---|---|---|
| 1,854,098 | A | 4/1932 | Black |
| 2,872,415 | A | 2/1959 | Schleyer et al. |
| 4,104,165 | A | 8/1978 | Braswell |
| 4,136,032 | A | 1/1979 | Bakken et al. |
| 4,313,825 | A | 2/1982 | Fleckenstein et al. |
| 4,347,143 | A | 8/1982 | Righetti |
| 4,619,763 | A | 10/1986 | O'Brien |
| 4,659,463 | A | 4/1987 | Chandler et al. |
| 4,956,080 | A | 9/1990 | Josefik |
| 5,007,994 | A | 4/1991 | Snee |
| 5,032,059 | A | 7/1991 | McCall et al. |
| 5,087,377 | A | 2/1992 | Josefik |
| 5,096,580 | A | 3/1992 | Auchincloss |
| 5,096,596 | A | 3/1992 | Hellenbrand et al. |
| 5,167,806 | A | 12/1992 | Wang et al. |
| 5,354,459 | A | 10/1994 | Smith |
| 5,433,866 | A | 7/1995 | Hoppe et al. |
| 5,494,576 | A | 2/1996 | Hoppe et al. |
| 5,494,583 | A | 2/1996 | Dieter |
| 5,919,373 | A | 7/1999 | Naaktgeboren |
| 6,325,943 | B1 * | 12/2001 | Kohlenberg ............ 210/741 |
| 7,300,569 | B2 * | 11/2007 | Petty ..................... 210/138 |
| 2005/0247634 | A1 | 11/2005 | Petty |

FOREIGN PATENT DOCUMENTS

EP 0 302 708 2/1989

OTHER PUBLICATIONS

Fleck Model 2850 Control Valve Service Manual, at least as early as Feb. 29, 2008.

* cited by examiner

*Primary Examiner* — Chester T Barry
(74) *Attorney, Agent, or Firm* — Baker & Daniels LLP

(57) ABSTRACT

Water purification systems utilizing oxidation. By passing water through a chamber of air, the impurities within the water, such as iron, manganese, and/or hydrogen sulfide gas, may be oxidized. The oxidized constituents in the water may then precipitate out and be removed by filter media. Thus, by utilizing oxidation, the impurities most commonly found in a consumer's water are readily removed. Additionally, the water purification systems of the present invention may also elevate the pH, i.e., reduce the hydronium ion concentration, of the water when the water is acidic. By raising the pH of the water, the oxidation of impurities, such as iron and manganese, is more complete and also occurs at a faster rate. Additionally, the corrosivity of the water is also reduced when the pH is elevated.

16 Claims, 9 Drawing Sheets

WATER PURIFICATION SYSTEMS

CROSS REFERENCE TO RELATED APPLICATIONS

This application claims the benefit under 35 U.S.C. §119 (e) of U.S. Provisional Patent Application Ser. No. 61/032,628, filed Feb. 29, 2008.

BACKGROUND

1. Field of the Invention

The present invention relates to water purification systems and, particularly, to water purification systems utilizing oxidation.

2. Description of the Related Art

Water purification systems are commonly used to purify water drawn for consumer use. The water may be obtained directly by the consumer from an individual well or may be provided to the consumer by a municipality or corporation. Irrespective of how the water is provided to the consumer, the water may include impurities that the consumer considers to be undesirable. For example, iron, manganese, hydrogen sulfide, and/or arsenic may be dissolved or otherwise contained within the water. These compounds may negatively effect the clarity, color, odor, and/or taste of the water. Hydrogen sulfide, for example, has an unpleasant odor, is highly corrosive, and is also highly toxic.

A variety of water processing systems are available, either for commercial or consumer use. For example, zeolite based water softener systems are widely used to control water hardness, i.e., remove iron from water, but do not remove other impurities, such as hydrogen sulfide. Additionally, as the impurities contained within an individual consumer's water vary geographically, a conventional system may not successfully remove some of an individual consumer's specific impurities. Moreover, depending on the conditions under which the water was obtained, the concentrations of the impurities may be widely varied, rendering consistent treatment difficult.

SUMMARY

The present invention provides water purification systems and, particularly, water purification systems utilizing oxidation. By passing water through air, the impurities within the water, such as iron, manganese, and/or hydrogen sulfide gas, are oxidized. The oxidized constituents in the water then precipitate out and are removed by filter media. Thus, by utilizing oxidation, the impurities most commonly found in a consumer's water are readily removed. Additionally, the water purification systems of the present invention may also elevate the pH, i.e., decrease the hydronium ion concentration, of the water when the water is acidic. By raising the pH of the water, the oxidation of impurities, such as iron and manganese, is more complete and also occurs at a faster rate. Additionally, the corrosivity of the water is reduced when the pH is elevated.

In one exemplary embodiment, the present invention provides a two-tank water purification system. The two-tank system utilizes a first, oxidation tank that includes a headspace of air. As water passes through the headspace, impurities in the water are oxidized. The water is then transferred to the second, filter tank where impurities precipitated in the water pass through filter media and are removed from the water. In another exemplary embodiment, the present invention provides a three-tank water purification system. The three-tank water purification system is similar to the two-tank system in that it utilizes a first, oxidation tank and a second, filter tank. However, the three-tank system also provides a third, ion resin tank. By passing the water through the ion resin tank, the hardness of the water is reduced. Advantageously, by utilizing an oxidation tank, the present invention coverts arsenic(V) into arsenic(III), which may be removed by filter media contained within the filter tank. Thus, the present systems allow for a substantial reduction in the arsenic level in a consumer's water supply.

In one form thereof, the present invention provides a system for removing impurities from water, the system including: a water inlet; an oxidation tank having a headspace of air contained therein, said oxidation tank in fluid communication with said water inlet through a first pathway; a venturi in fluid communication with said water inlet and said oxidation tank through a second pathway, wherein water received from said water inlet may enter said oxidation tank through both of said first pathway and said second pathway, said venturi having an air inlet in constant fluid communication with the ambient environment, wherein air drawn through said air inlet of said venturi is delivered to said oxidation tank to create said headspace of air; a filter tank in fluid communication with said oxidation tank, said filter tank having filter media contained therein, wherein water travels through said headspace of air in said oxidation tank to oxidize the impurities in the water and then passes through said filter media in said filter tank to remove the impurities from the water; and a water outlet in fluid communication with said filter tank.

In another form thereof, the present invention provides a system for removing impurities from water, the system including: a water inlet; an oxidation tank having a headspace of air contained therein, said oxidation tank in fluid communication with said water inlet through a first pathway; a venturi in fluid communication with said water inlet and said oxidation tank through a second pathway, wherein water received from said water inlet may enter said oxidation tank through both of said first pathway and said second pathway; a filter tank in fluid communication with said oxidation tank, said filter tank having filter media contained therein, wherein water travels through said headspace of air in said oxidation tank to oxidize the impurities in the water and then passes through said filter media in said filter tank to remove the impurities from the water; an ion resin tank in fluid communication with said filter tank, said ion resin tank having a resin media position therein, wherein the water passes through said resin media to lower the hardness of the water; and a water outlet in fluid communication with said ion resin tank.

In yet another form thereof, the present invention provides a method of removing impurities from water, the method including: passing water through a powerhead and into an oxidation tank; passing the water through a headspace of air to oxidize impurities in the water; transferring the water to a filter tank; passing the water through filter media contained within the filter tank to filter oxidized impurities from the water; passing the water through the powerhead; and providing the water to a consumer.

BRIEF DESCRIPTION OF THE DRAWINGS

The above-mentioned and other features and advantages of this invention, and the manner of attaining them, will become more apparent and the invention itself will be better understood by reference to the following descriptions of embodiments of the invention taken in conjunction with the accompanying drawings, wherein.

Corresponding reference characters indicate corresponding parts throughout the several views. The exemplifications set out herein illustrate preferred embodiments of the invention and such exemplifications are not to be construed as limiting the scope of the invention in any manner.

DETAILED DESCRIPTION

Figure 1:
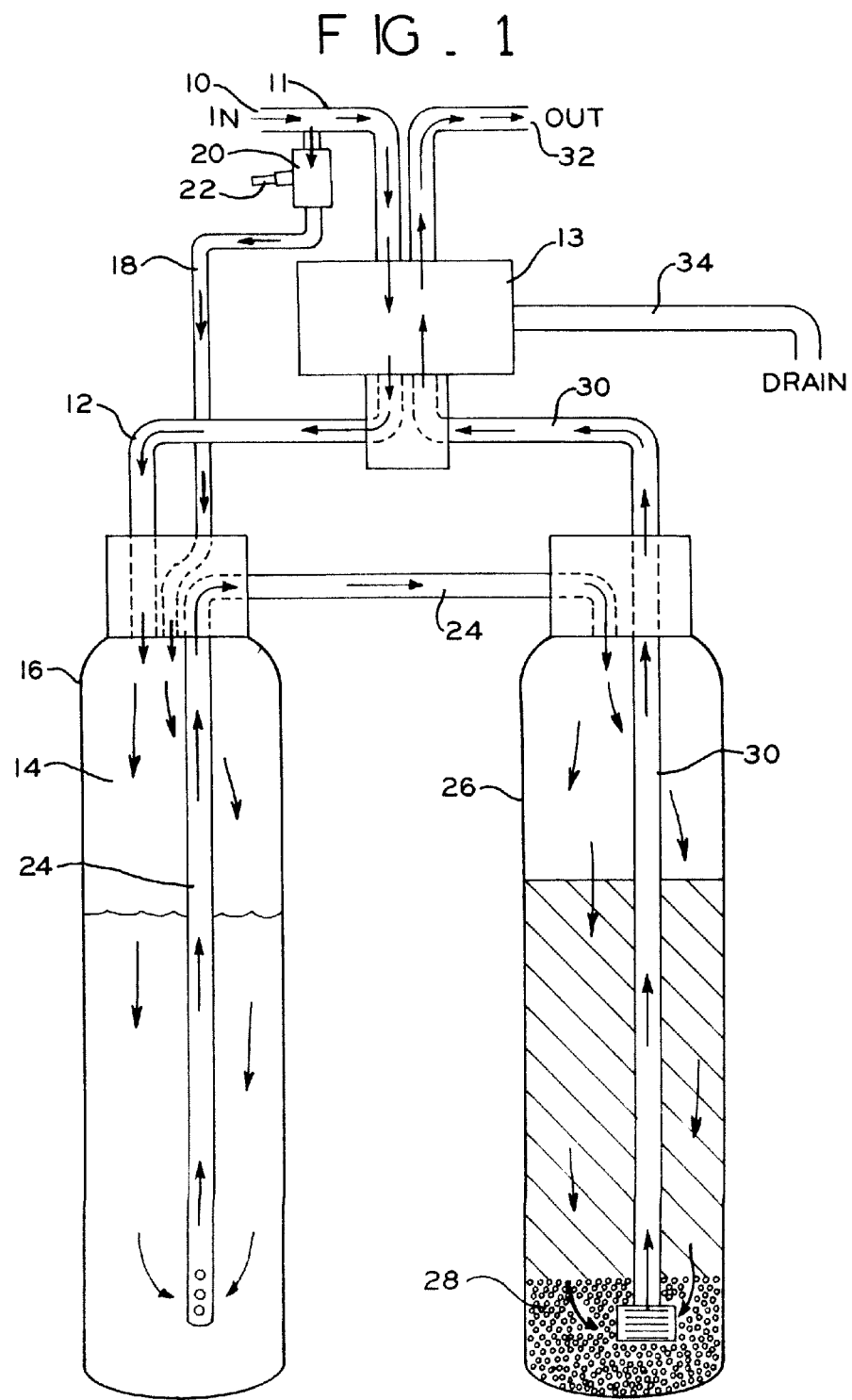
FIG. 1 is cross-sectional, schematic view of a water purification system of the present invention according to an exemplary embodiment depicting the system in a service cycle.

Corresponding reference characters indicate corresponding parts throughout the several views. The exemplifications set out herein illustrate preferred embodiments of the invention and such exemplifications are not to be construed as limiting the scope of the invention in any manner.

Referring to FIG. 1, a two-tank water purification system manufactured in accordance with the present invention is shown in a service cycle. In this cycle, water enters the purification system through inlet 10, travels through pipes 11, 12, which at least partially define a first pathway, and enters tank 16. Fluid communication between inlet 10 and pipe 12, as well as outlet 32 and pipes 30, 34 described below, may be controlled by a standard water softener powerhead, such as powerhead 13. In one exemplary embodiment, powerhead 13 is a Fleck® Model 2510 control valve drive assembly commercially available from Pentair, Inc. of Golden Valley, Minnesota. Fleck® is a registered trademark of Fleck Controls, Inc. of Brookfield, Wisconsin.

As water enters the system, if the flow of water through inlet 10 is high enough, a portion of the water traveling through pipe 11 will be diverted through pipe 18, which at least partially defines a second pathway parallel to the first pathway, and venturi 20. In one exemplary embodiment, the second pathway is discrete from the first pathway from inlet 10 to oxidation tank 16, described below. While the flow rate required in any particular system will depend on the size of the purification system, the pressure of the inlet water, and the discharge pressure of the water, a residential system may draw air near its approximate peak flow rate of 10 gallons per minute, for example. As water passes through venturi 20, air enters the water traveling therethrough via venturi air intake 22. In order to control the amount of air entering the system, the opening defining air intake 22 may be restricted.

The water traveling through pipes 12, 18 then enters first, oxidation tank 16. As the water enters tank 16 it falls through air defining head space 14 in tank 16, causing impurities in the water to be oxidized. The water then exits tank 16 via pipe 24 and travels to second, filter tank 26. The water within tank 26 is then filtered through filter media 28 and exits tank 26 via pipe 30. Filter media 28 may be a calcium carbonate media, filter sand, Birm® filter media, greensand, dolomite, Filter-Age filter media, or an arsenic absorbent media, for example. Birm® and Filter-Age are registered trademarks of Clark Corporation of Windsor, Wisconsin. In one exemplary embodiment, a portion of the filter media will be dissolved in the water if the water is acidic, i.e., has a pH less than 7.0. As a result, the pH of the water will be increased, facilitating greater oxidation of the impurities and lessening the corrosivity of the water. When operating in the service cycle, pipe 30 is in fluid communication with outlet 32. Outlet 32 then connects to the water service line of a consumer.

Advantageously, by passing the water through a headspace of air, the impurities in the water are oxidized and begin to precipitate out of the water. For example, iron, manganese, and hydrogen sulfide may all be oxidized. Additionally, arsenic(V) may be converted to arsenic(III) as a result of oxidation. While arsenic(V) is able to pass through filter media 28, arsenic(III) is captured in filter media 28 and removed from the water. As a result, the present purification system provides a substantially higher arsenic removal rate than standard purification systems when an arsenic absorbent media is employed.

Figure 2:
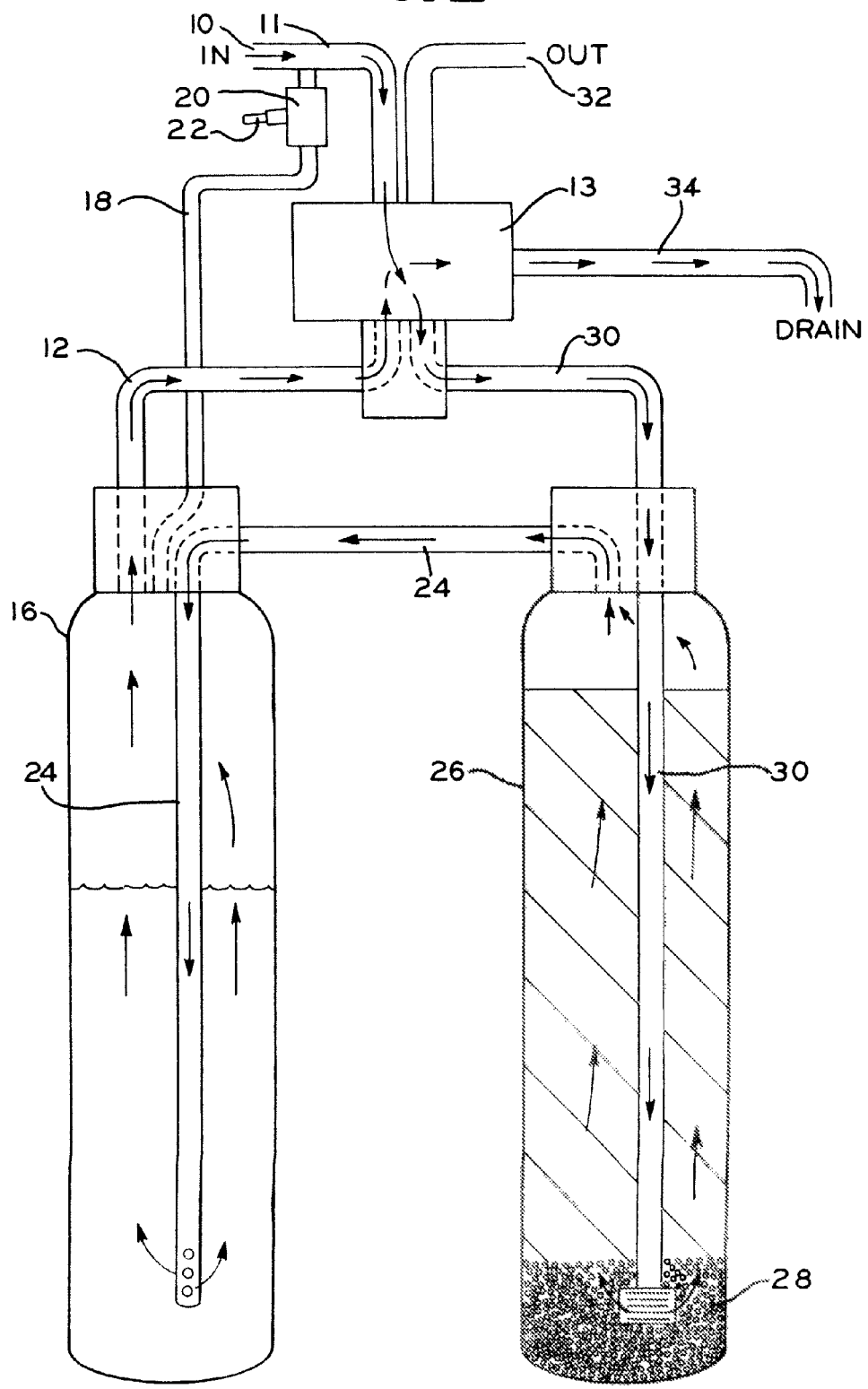
FIG. 2 is a cross-sectional, schematic view of the system of FIG. 1 depicting the system in a backwash cycle.

Referring to FIG. 2, in order to flush the purification system and remove any particulate matter from filter media 28 within tank 26, the system enters a backwash cycle. In the backwash cycle, inlet 10 and pipe 11 are automatically placed in fluid communication with pipe 30 by powerhead 13, causing intake water traveling through pipes 11, 30 to enter tank 26. Specifically, powerhead 13 may place inlet 10 and pipe 11 in fluid communication with pipe 30 after the passage of a predetermined amount of time or after the passage of a predetermined amount of water through powerhead 13, for example. As the water exits the bottom of pipe 30, it travels through filter media 28 dislodging various particulate matter and, once tank 26 is filled, the water exits tank 26 via pipe 24. Water traveling through pipe 24 then enters tank 16 and begins to fill tank 16. As tank 16 fills, air trapped within head space 14 is forced through pipe 12, which, as a result of the activation of powerhead 13 described above, is now in fluid communication with drain pipe 34. Once the water level reaches pipe 12, the water travels through pipe 12 and exits through drain pipe 34. After running for a sufficient period of time to remove the particulate matter from the system via drain pipe 34, the system enters a slow rinse cycle.

Figure 3:
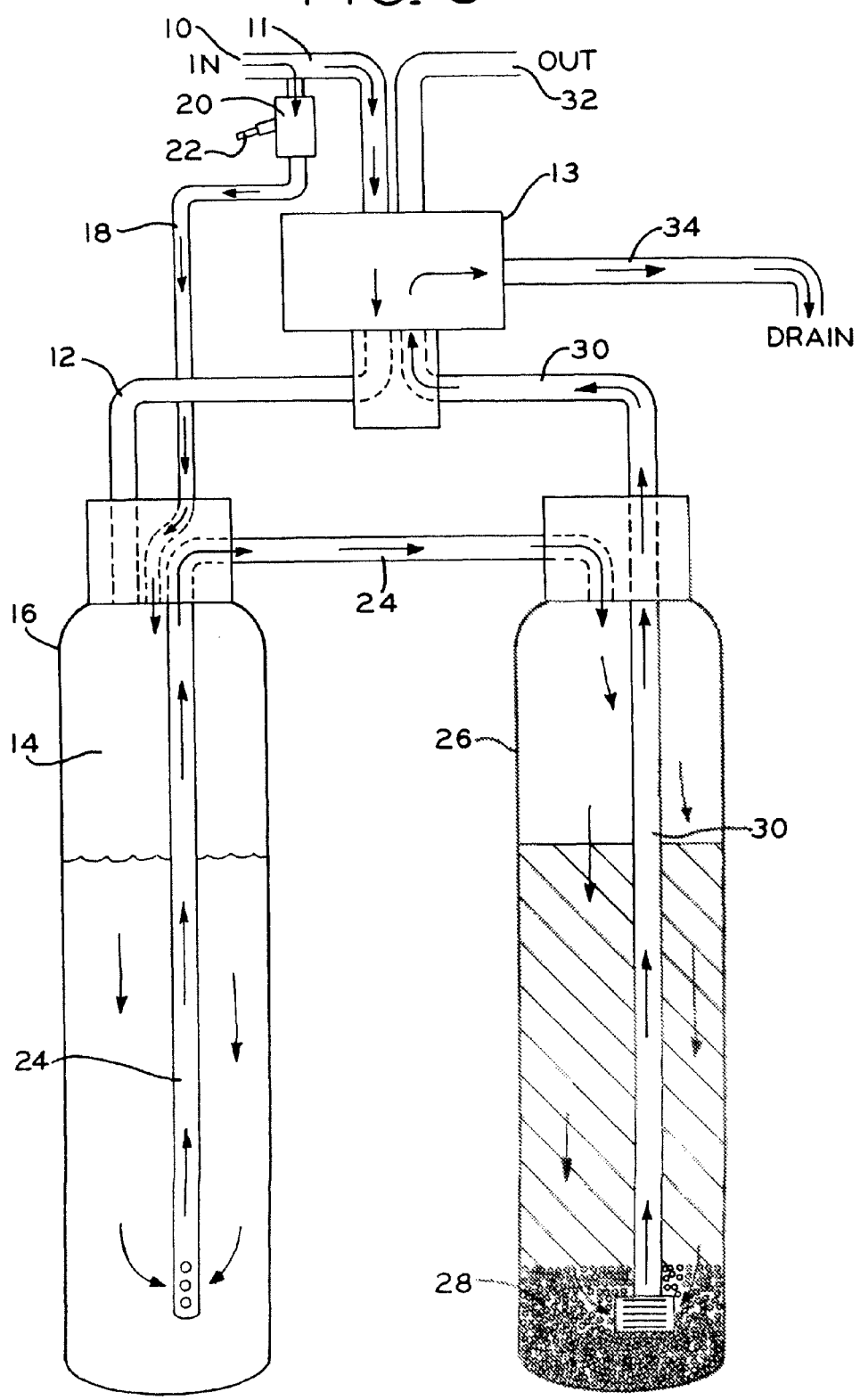
FIG. 3 is a cross-sectional, schematic view of the system of FIG. 1 depicting the system in a slow rinse cycle.

Referring to FIG. 3, the slow rinse cycle is shown. This cycle is utilized to replenish head space 14 with fresh, oxygenated air. Specifically, in this cycle, powerhead 13 is activated to prevent fluid communication between pipe 11 and pipe 12. As a result, water traveling through pipe 11 is forced through pipe 18 and venturi 20. As the water travels through venturi 20, air enters air intake 22 and is combined therewith. The water is then delivered via pipe 18 into tank 16. Once within tank 16, the air and water separate and head space 14 begins to form. Water will continue to fill tank 16 and compress the air within head space 14 until head space 14 and the water contained within tank 16 are at substantially equal pressures. At this point, as additional water enters tank 16, it will begin to travel up pipe 24 and into tank 26. The water within tank 26 will then travel through filter media 28 and enter pipe 30. Pipe 30, as a result of the activation of powerhead 13 described above, is now in fluid communication with drain pipe 34 and water traveling through pipe 30 will exit the system via drain pipe 34.

Figure 4:
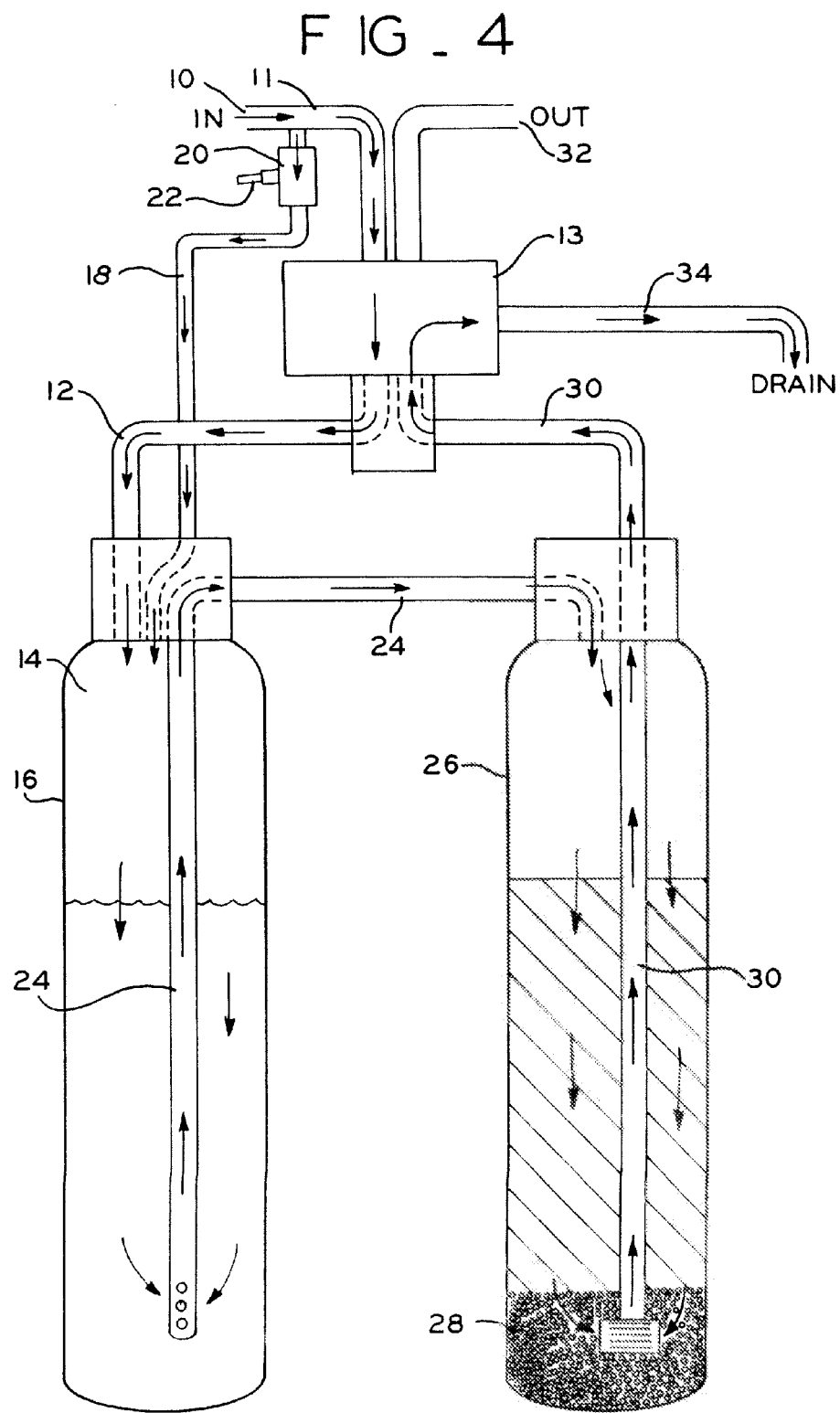
FIG. 4 is a cross-sectional, schematic view of the system of FIG. 1 depicting the system in a fast rinse cycle.

Once the slow rinse cycle is complete, the system will enter a fast rinse cycle, shown in FIG. 4. In this cycle, powerhead 13 is activated to allow water entering inlet 10 to travel through pipes 11, 12 and enter head space 14 of tank 16. Additionally, if the volume of water traveling through pipe 11 is sufficiently high, a portion of the water will be diverted through pipe 18 and travel through venturi 20 to draw air into the water, as described above. As the water enters tank 16 via pipes 12, 18, the air will separate from the water and rise within tank 16 to maintain head space 14. The water will then exit tank 16 via pipe 24 and enter tank 26. After passing through filter media 28, the water will enter pipe 30 and exit the system via drain pipe 34. Once the fast rinse is complete, the system will reenter the service cycle. Specifically, powerhead 13 is again actuated and inlet 10 is placed in fluid communication with pipe 11, as described above. The two-tank system will then, after the passage of a predetermine amount of time or the passage of a predetermined amount of water through powerhead 13, repeat the process of performing each of the cycles described in detail above.

Referring to FIGS. 5-9, a three-tank water purification system manufactured in accordance with the present invention is shown. Similar to the two-tank water purification system described in detail above with reference to FIGS. 1-4, the three-tank system is a water purification system based, in part, on oxidation. However, in addition to the tanks described above with reference to the two-tank system, the three-tank system adds a third, water softener and/or ion resin tank to facilitate additional water treatment. Specifically, the third tank is used to lessen the hardness of the water.

Figure 5:
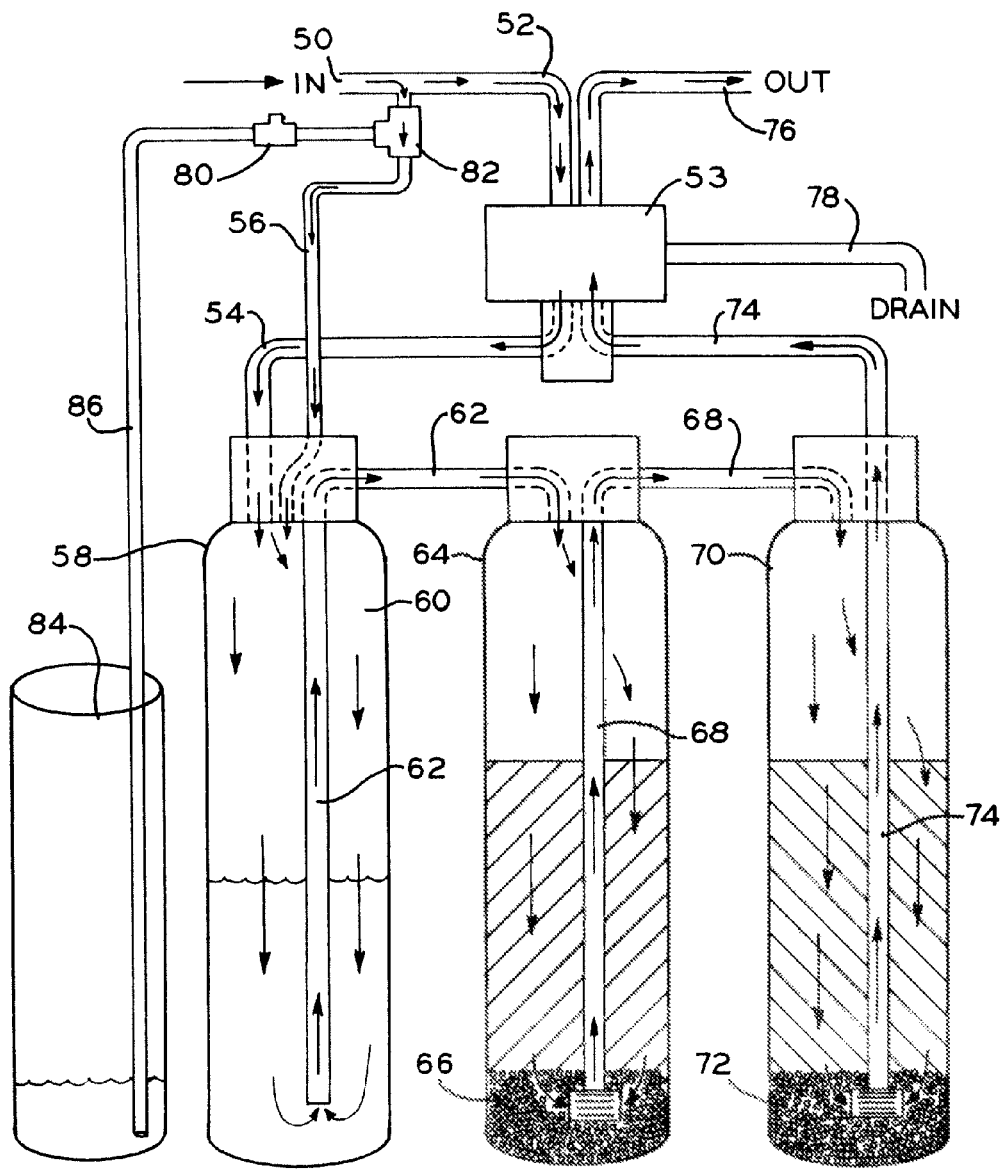
FIG. 5 is a cross-sectional, schematic view of a water purification system of the present invention according to another exemplary embodiment depicting the system in a service cycle.

Referring to FIG. 5, the three-tank water purification system is shown in a service position. Thus, water received through inlet 50 will travel through pipes 52, 54, which at least partially define a first pathway, and through pipe 56, which at least partially defines a second pathway parallel to the first pathway, to enter tank 58. In one exemplary embodiment, the second pathway is discrete from the first pathway from inlet 50 to oxidation tank 64, described below. Fluid communication between pipes 52, 54, as well as outlet 76 and pipes 74, 78 described below, may be controlled by a standard water softener powerhead, such as powerhead 53. In one exemplary embodiment, powerhead 53 is a Fleck® Model 2510 automatic backwash valve drive assembly commercially available from Pentair, Inc. of Golden Valley, Minnesota.

The water entering tank 58 travels through air within head space 60, oxidizing impurities in the water and causing them to precipitate out of the water. The water then travels through pipe 62 and enters tank 64 where it passes through filter media 66. Filter media 66 may be a calcium carbonate filter media, filter sand, Birm® filter media, greensand, dolomite, Filter-Ag® filter media, or an arsenic absorbent media, for example. Filter media 66 captures the precipitated impurities while allowing the water to pass therethrough. In one exemplary embodiment, a portion of the filter media will be dissolved in the water if the water passing therethrough is acidic, i.e., has a pH less than 7.0. As a result, the pH of the water will be increased. The water then enters pipe 68 and travels to tank 70. Within tank 70, the water travels through resin media 72 and exits via pipe 74, which is in fluid communication with outlet pipe 76.

In one exemplary embodiment, resin media 72 may be a high capacity ion exchange softener resin or a fine mesh ion exchange softener resin, for example. By passing the water through resin media 72, the hardness of the water is substantially reduced. In one exemplary embodiment, the hardness of the water is reduced to less than 5 parts per million of calcium carbonate. Additionally, by passing the water through resin media 72, arsenic, nitrates, and/or tannic acid may also be substantially removed from the water. In one exemplary embodiment, resin media 72 is selected so that it will remove any substance with a cationic or anionic valence from the water.

Figure 6:
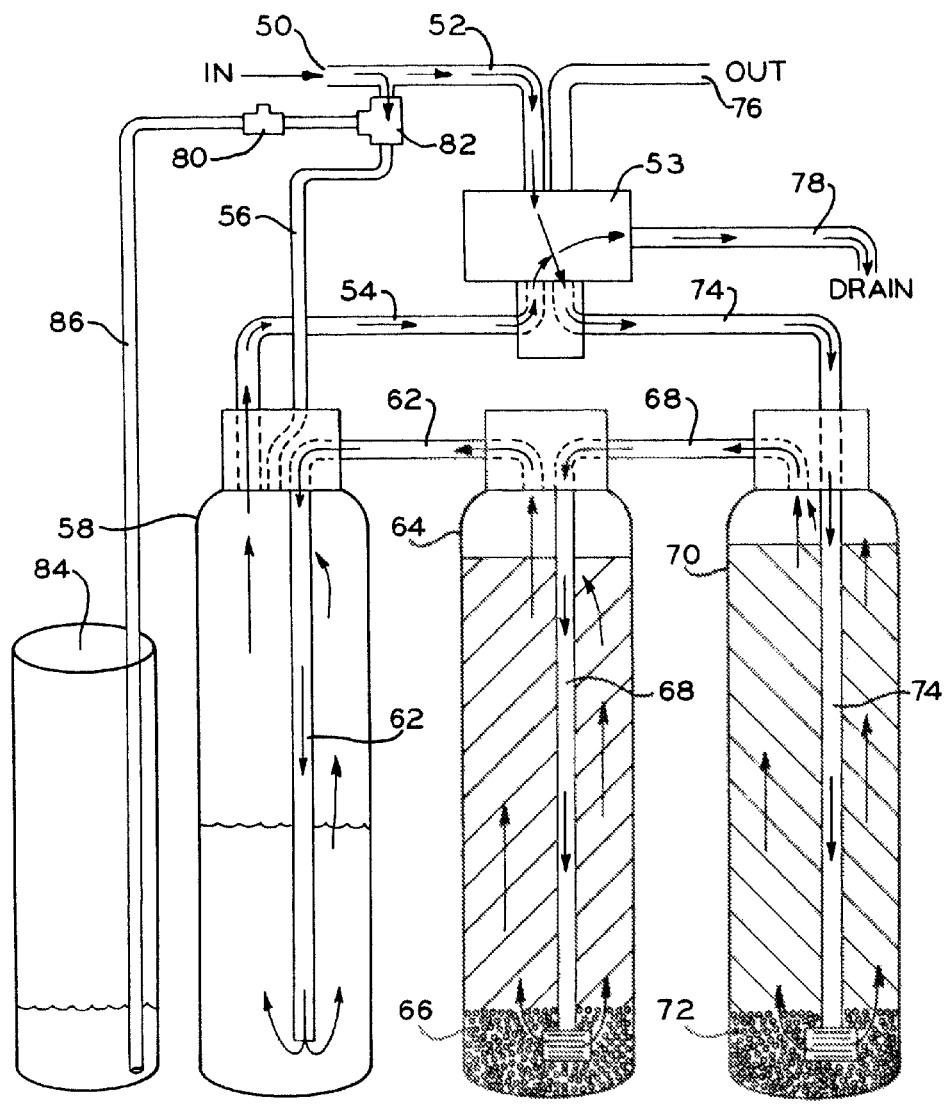
FIG. 6 is a cross-sectional, schematic view of the system of FIG. 5 depicting the system in a backwash cycle.

In order to backwash resin media 72 and filter media 66, the three-tank purification system is placed into a backwash cycle, as shown in FIG. 6. Referring to FIG. 6, water traveling through inlet 50 passes through pipe 52, which, as a result of activation of powerhead 53, is now in fluid communication with pipe 74. Specifically, powerhead 53 places pipes 52, 74 in fluid communication with one another after the passage of a predetermined amount of time or after the passage of a predetermined amount of water through powerhead 53, for example. As a result, the water travels through pipes 52, 74 and enters tank 70 passing through resin media 72. The water then travels through pipe 68 into tank 64 and passes through filter media 66, removing particulate matter therefrom. The water then exits tank 64 via pipe 62 and enters tank 58.

As water enters tank 58, the water level within tank 58 rises and forces the air in head space 60 out of tank 58 through pipe 54, which, as a result of the activation of powerhead 53 described above, is now in fluid communication with drain pipe 78. Once the water level within tank 58 reaches pipe 54, the water travels through pipe 54 to drain pipe 78 and exits the system. Additionally, to prevent water exiting tank 58 from entering inlet 50 through pipe 56, a check valve is provided along the length of pipe 56. After running for a sufficient period of time to remove the particulate matter from the system and discharge the same through drain pipe 78, the system enters a slow rinse cycle.

Figure 7:
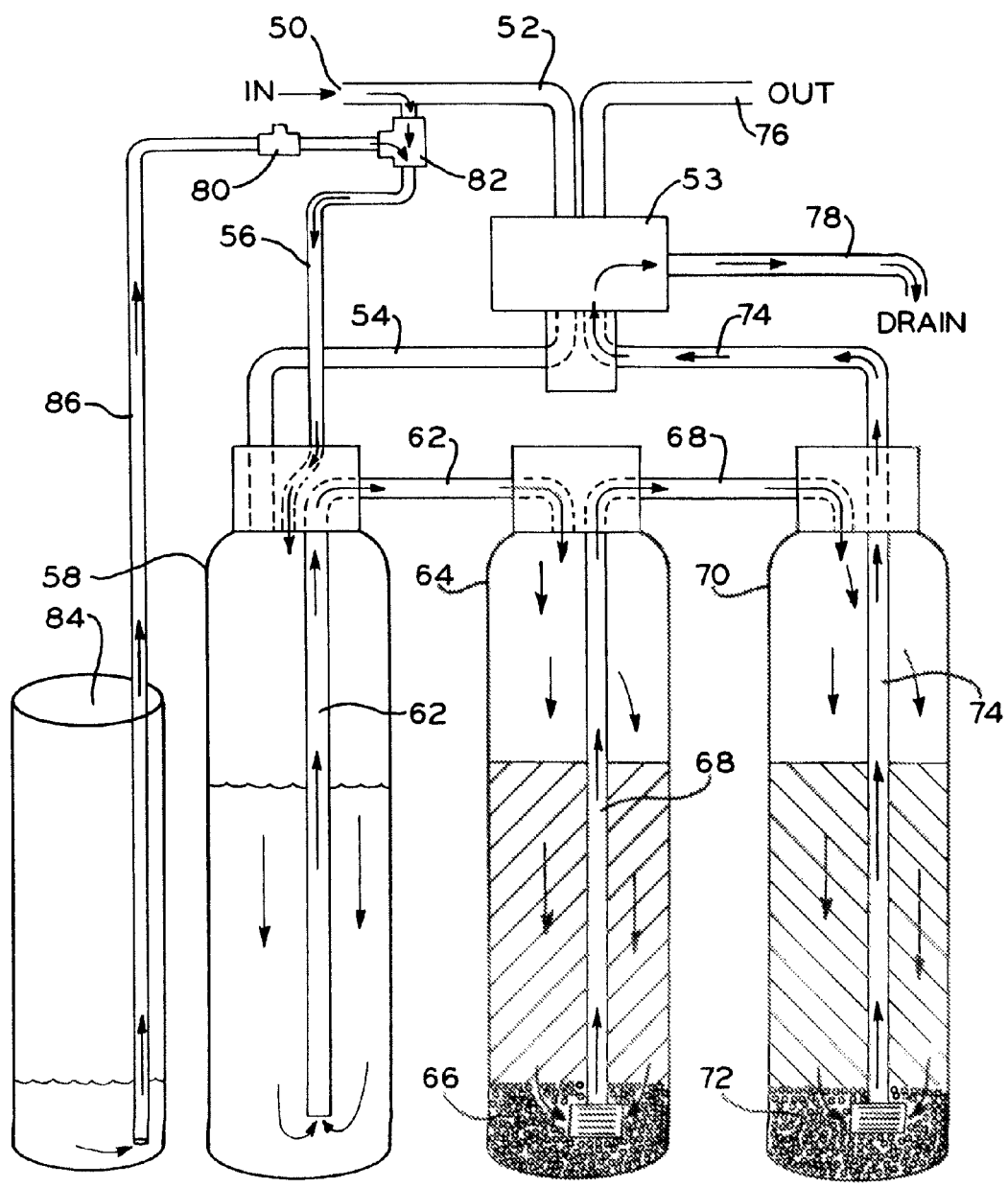
FIG. 7 is a cross-sectional, schematic view of the system of FIG. 5 depicting the system in a slow rinse cycle.

Referring to FIG. 7, during the slow rinse cycle, the three-tank purification system operates in several ways like a conventional water softener. Specifically, during the slow rinse cycle, valve 80 is opened allowing for brine to be drawn from salt tank 84 through pipe 86. In one exemplary embodiment, valve 80 is electronically actuated by operation of powerhead 53. As water enters inlet 50 and travels through pipe 52, a portion of the water will be diverted through pipe 56 where the water travels through venturi 82. As the water travels through venturi 82, it draws brine from salt tank 84 through pipe 86 and into pipe 56. The brine traveling through pipe 56 then enters tank 58. The water and brine then travel from tank 58 through pipe 62 and into tank 64. Once within tank 64, the water and brine travel through filter media 66 and pipe 68 to enter tank 70. The water and brine are then drawn through resin media 72 to regenerate resin media 72. The water and remaining brine then exit tank 70 through pipe 74, which, due to activation of powerhead 53, is in fluid communication with drain pipe 78.

However, unlike a conventional water softener, when salt tank 84 is emptied to a level below the inlet of pipe 86, a check valve does not stop the flow of fluid into pipe 86. As a result, air from the ambient environment begins to enter pipe 86 and is pulled into pipe 56, ultimately entering tank 58 through venturi 82. In this matter, the air within tank 58 is refilled in a manner similar to that described in detail above with reference to the two-tank purification system. Once a sufficient level of air has accumulated in tank 58 to form head space 60, valve 80 is closed, such as by activation of powerhead 53, and water flowing from inlet 50 is allowed to flow through pipes 52, 56 and into tank 58. Water will continue to enter tank 58 and will pressurize head space 60 until the pressure of the air within head space 60 is substantially equal to the pressure of the water. Once the pressures are equilibrated, water begins to rise in pipe 62 and travel to tank 64. The water then travels through filter media 66 and pipe 68 to enter tank 70. Once within tank 70, the water will travel through resin media 72 and pipe 74, which is in fluid communication with drain pipe 78, allowing the water to exit the system. Once head space 60 is filled and pressurized, the system enters a fast rinse cycle.

Figure 8:
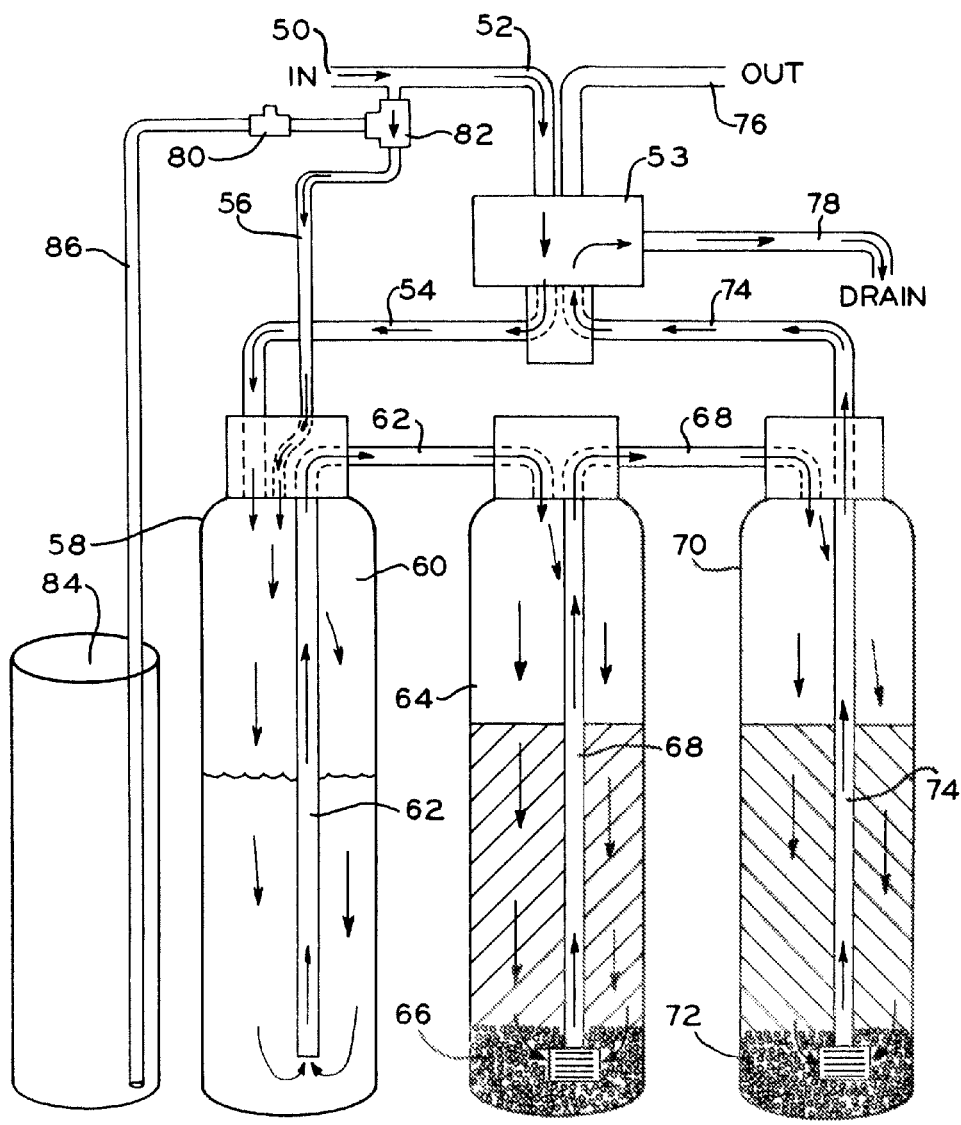
FIG. 8 is a cross-sectional, schematic view of the system of FIG. 5 depicting the system in a fast rinse cycle.

Referring to FIG. 8, once in the fast rinse cycle, valve 80 is closed preventing additional brine and/or air from entering pipe 56. As water enters inlet 50 and travels through pipes 52, 56 it enters tank 58. The water then travels from tank 58 through pipe 62 and into tank 64. Once within tank 64, the water travels through filter media 66 and pipe 68 to enter tank 70. The water then passes through resin media 72 and exits tank 70 through pipe 74, which, due to activation of powerhead 53, is in fluid communication with drain pipe 78. Once the fast rinse cycle is completed, the system enters a refill cycle.

Figure 9:
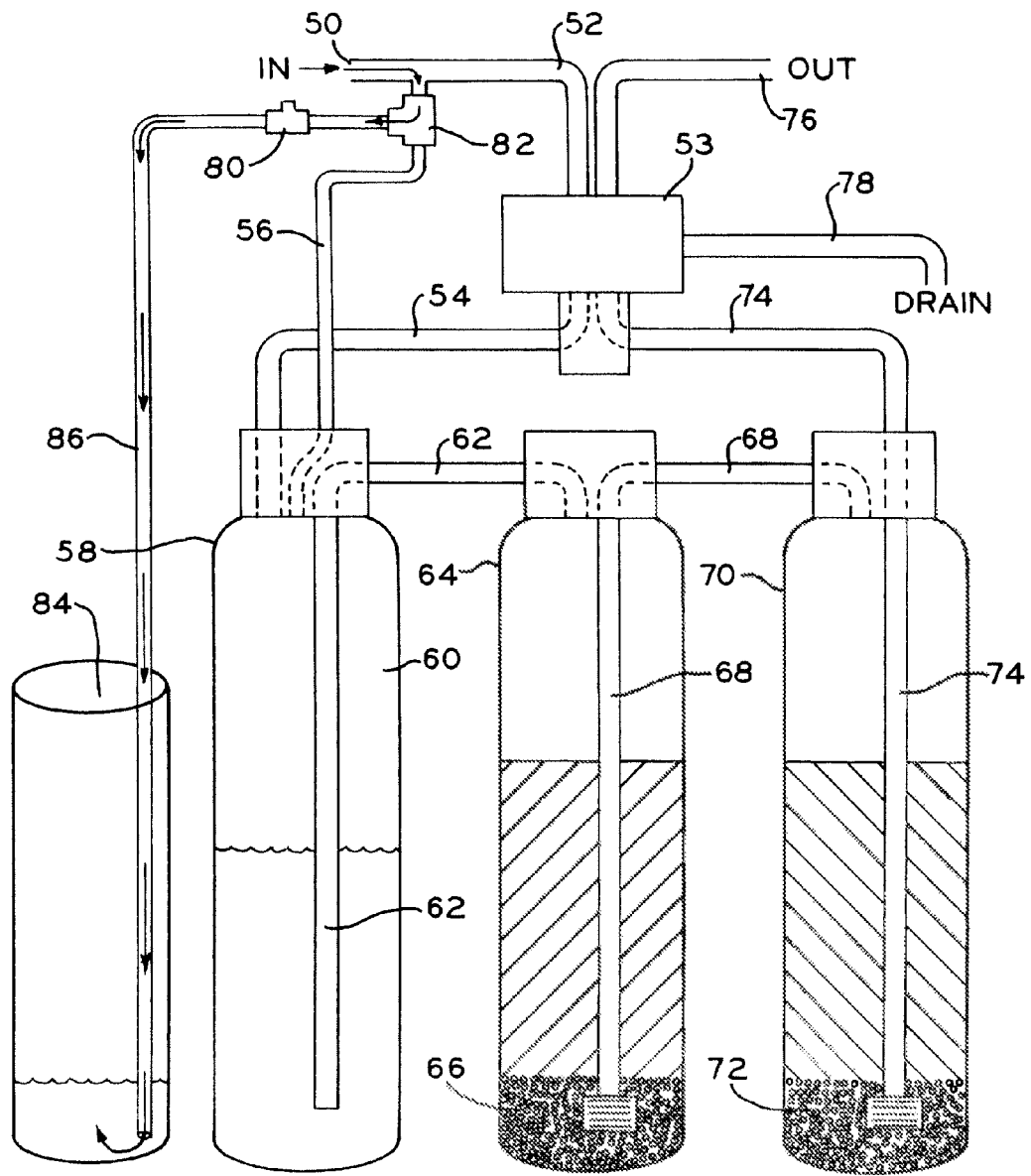
FIG. 9 is a cross-sectional, schematic view of the system of FIG. 5 depicting the system in a refill cycle.

Referring to FIG. 9, once in the refill cycle, powerhead 53 is activated and valve 80 is again opened. In one exemplary embodiment, valve 80 is electronically actuated by operation of powerhead 53. Additionally, water is diverted through pipe 56 and pipe 86 to enter salt tank 84. Once salt tank 84 is sufficiently filled with water, valve 80 is closed and the three-tank purification system reenters the service position. The three-tank system will then repeat the process of performing each of the cycles described in detail above after the passage of a predetermined amount of time or the passage of a predetermined amount of water through powerhead 53.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for removing impurities from water, the system comprising:
    a water inlet;
    an oxidation tank having a headspace of air contained therein, said oxidation tank in fluid communication with said water inlet through a first pathway;
    a venturi in fluid communication with said water inlet and said oxidation tank through a second pathway fluidly parallel to said first pathway, wherein water received from said water inlet may enter said oxidation tank through both of said first pathway and said second pathway, said venturi having an air inlet in constant fluid communication with the ambient environment, wherein air drawn through said air inlet of said venturi is delivered to said oxidation tank to create said headspace of air;
    a filter tank in fluid communication with said oxidation tank, said filter tank having filter media contained therein, wherein water travels through said headspace of air in said oxidation tank to oxidize the impurities in the water and then passes through said filter media in said filter tank to remove the impurities from the water; and
    a water outlet in fluid communication with said filter tank.

2. The system of claim 1, wherein said filter tank is in direct fluid communication with said oxidation tank.

3. The system of claim 1, further comprising a powerhead in fluid communication with said oxidation tank, said filter tank, said water inlet, and said water outlet, wherein said venturi is located externally of said powerhead.

4. The system of claim 3, further comprising a drain line, said powerhead in fluid communication with said drain line.

5. The system of claim 3, wherein said oxidation tank and said filter tank are in direct fluid communication with one another and in direct fluid communication with said powerhead.

6. The system of claim 1, wherein said filter media is selected from the group consisting of calcium carbonate media, filter sand, Birm filter media, greensand, dolomite, Filter-Ag filter media, and arsenic absorbent media.

7. A system for removing impurities from water, the system comprising:
    a water inlet;
    an oxidation tank having a headspace of air contained therein, said oxidation tank in fluid communication with said water inlet through a first pathway;
    a venturi in fluid communication with said water inlet and said oxidation tank through a second pathway fluidly parallel to said first pathway, wherein water received from said water inlet may enter said oxidation tank through both of said first pathway and said second pathway;
    a filter tank in fluid communication with said oxidation tank, said filter tank having filter media contained therein, wherein water travels through said headspace of air in said oxidation tank to oxidize the impurities in the water and then passes through said filter media in said filter tank to remove the impurities from the water;
    an ion resin tank in fluid communication with said filter tank, said ion resin tank having a resin media position therein, wherein the water passes through said resin media to lower the hardness of the water; and
    a water outlet in fluid communication with said ion resin tank.

8. The system of claim 7, wherein said ion resin tank is in direct fluid communication with said filter tank, the system further comprising a powerhead in fluid communication with said oxidation tank, said ion resin tank, said water inlet, and said water outlet, wherein said venturi is located externally of said powerhead.

9. The system of claim 8, further comprising a drain line, said powerhead in fluid communication with said drain line.

10. The system of claim 7, wherein said filter media is selected from the group consisting of calcium carbonate media, filter sand, Birm filter media, greensand, dolomite, Filter-Ag filter media, and arsenic absorbent media.

11. The system of claim 7, further comprising a brine tank in fluid communication with said venturi.

12. A system for removing impurities from water, the system comprising:
    a water inlet;
    a powerhead in fluid communication with said water inlet through a first discrete pathway;
    a venturi in fluid communication with said water inlet through a second discrete pathway fluidly parallel to said first discrete pathway, wherein water received from said water inlet may enter said oxidation tank via both of said first discrete pathway and said second discrete pathway, said venturi having an air inlet;
    an oxidation tank having a headspace of air contained therein, said oxidation tank in fluid communication with said powerhead via said first discrete pathway and in fluid communication with said venturi via said second discrete pathway, wherein air drawn through said air inlet of said venturi is delivered to said oxidation tank to create said headspace of air;
    a filter tank in fluid communication with said oxidation tank, said filter tank having filter media contained therein, wherein water travels through said headspace of air in said oxidation tank to oxidize the impurities in the water and then passes through said filter media in said filter tank to remove the impurities from the water; and a water outlet in fluid communication with said powerhead.

13. The system of claim 12, wherein said venturi is located externally of said powerhead.

14. The system of claim 12, wherein said filter tank is in direct fluid communication with both of said oxidation tank and said powerhead.

15. The system of claim 12, further comprising an ion resin tank in direct fluid communication with both of said powerhead and said filter tank, whereby water received from said filter tank by said ion resin tank may be received by said powerhead.

16. The system of claim 12, further comprising a drain line, said powerhead in fluid communication with said drain line.

* * * * *